(12) United States Patent
Cerqueira et al.

(10) Patent No.: US 12,249,190 B2
(45) Date of Patent: Mar. 11, 2025

(54) METHOD AND SYSTEM FOR CHECKING A LEVEL OF DAMAGE OF AT LEAST ONE AIRCRAFT PART, AND ASSOCIATED AIRCRAFT

(71) Applicant: AIRBUS HELICOPTERS, Marignane (FR)

(72) Inventors: Stephane Cerqueira, Aix en Provence (FR); Jeremy Jouve, Senas (FR); Herve Morel, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 532 days.

(21) Appl. No.: 17/341,670

(22) Filed: Jun. 8, 2021

(65) Prior Publication Data

US 2021/0383618 A1 Dec. 9, 2021

(30) Foreign Application Priority Data

Jun. 8, 2020 (FR) ...................................... 2005954

(51) Int. Cl.
*G07C 5/00* (2006.01)
*G06F 16/29* (2019.01)
(Continued)

(52) U.S. Cl.
CPC .............. *G07C 5/006* (2013.01); *G06F 16/29* (2019.01); *G06Q 10/20* (2013.01); *G06T 7/0004* (2013.01);
(Continued)

(58) Field of Classification Search
CPC ....... G07C 5/006; G07C 5/0808; G06F 16/29; G06Q 10/20; G06T 7/0004; G06T 2207/30252
See application file for complete search history.

(56) References Cited

U.S. PATENT DOCUMENTS 6,466,888 B1 10/2002 McCool et al.
9,472,079 B2 10/2016 Meier
(Continued)

FOREIGN PATENT DOCUMENTS

EP 2393072 A1 12/2011
EP 3008531 B1 7/2019
(Continued)

OTHER PUBLICATIONS

Tan, Wenqian et al. A method for predicting aircraft flying qualities using neural networks. 2nd International Conference on Systems and Informatics (ICSAI 2014) in Shanghai, China.
(Continued)

*Primary Examiner* — Naeem Taslim Alam
(74) *Attorney, Agent, or Firm* — Brooks Kushman P.C.

(57) ABSTRACT

A method for checking a level of damage of at least one part of an aircraft. According to the disclosure, such a method comprises at least: a collection step for receiving data representative of measurements of at least one flight parameter, the data being generated during a mission of the aircraft by at least one embedded sensor; a projection step for projecting points onto a map in order to form an image point; an identification step for identifying, for each image point, an image zone in which the image point is located; and an analysis step for statistically analyzing the identified image zones and determining the level of damage of the at least one aircraft part.

20 Claims, 4 Drawing Sheets

(51) Int. Cl.
*G06Q 10/20* (2023.01)
*G06T 7/00* (2017.01)
*G07C 5/08* (2006.01)

(52) U.S. Cl.
CPC .. *G07C 5/0808* (2013.01); *G06T 2207/30252* (2013.01)

(56) References Cited

U.S. PATENT DOCUMENTS

| | | | |
|---|---|---|---|
| 9,697,655 B1* | 7/2017 | Eyhorn | G01M 15/14 |
| 10,733,166 B1* | 8/2020 | Pratt | G06F 16/26 |
| 11,410,056 B1* | 8/2022 | Xu | G07C 5/085 |
| 2006/0241886 A1* | 10/2006 | Ponziani | F02C 7/266 |
| | | | 702/113 |
| 2008/0091630 A1 | 4/2008 | Bonissone et al. | |
| 2013/0325286 A1* | 12/2013 | Lacaille | G05B 23/0221 |
| | | | 701/99 |
| 2014/0084677 A1* | 3/2014 | Haillot | F02C 7/36 |
| | | | 307/9.1 |
| 2015/0331975 A1 | 11/2015 | Garnier De Labareyre et al. | |
| 2016/0140155 A1* | 5/2016 | Bothier | G05B 23/024 |
| | | | 707/812 |
| 2016/0221683 A1* | 8/2016 | Roberts | B64D 27/02 |
| 2017/0001583 A1 | 1/2017 | Bernardo et al. | |
| 2017/0193372 A1* | 7/2017 | Schimert | G06N 5/04 |
| 2018/0170580 A1* | 6/2018 | Gouby | G06F 17/18 |

FOREIGN PATENT DOCUMENTS

| | | |
|---|---|---|
| EP | 3170160 B1 | 7/2019 |
| EP | 2676176 B1 | 11/2019 |
| FR | 2989186 A1 | 10/2013 |
| FR | 3006785 A1 | 12/2014 |
| FR | 3028331 A1 | 5/2016 |
| FR | 3038274 A1 | 1/2017 |
| WO | 2015172857 A1 | 11/2015 |
| WO | 2019055708 A1 | 3/2019 |

OTHER PUBLICATIONS

French Search Report for French Application No. FR2005954, Completed by the French Patent Office, Dated Jan. 28, 2021, 11 pages.

* cited by examiner

METHOD AND SYSTEM FOR CHECKING A LEVEL OF DAMAGE OF AT LEAST ONE AIRCRAFT PART, AND ASSOCIATED AIRCRAFT

CROSS REFERENCE TO RELATED APPLICATIONS

This application claims priority to French patent application No. FR 20 05954 filed on Jun. 8, 2020, the disclosure of which is incorporated in its entirety by reference herein.

TECHNICAL FIELD

The present disclosure relates to the field of checking and monitoring the level of damage or wear of the parts constituting an aircraft and, for example, parts that need to be replaced regularly.

More particularly, the disclosure relates to a specific method for checking a level of damage of at least one aircraft part, to a checking system for checking this level of damage and to an aircraft equipped with such a checking system.

BACKGROUND

Generally, systems for checking a level of damage of aircraft parts measure the time in use or in flight of each of the parts of an aircraft. When the time in use of a specific part has reached a predetermined threshold value, these checking systems can then be used to order a maintenance operation in order to replace this part.

However, the actual use of each aircraft may differ from aircraft to aircraft. One aircraft may place mechanical stress on its constituent parts much more quickly than another aircraft whose use generates less mechanical stress. In the interest of safety, checking systems therefore need to be configured to respond to the most demanding uses of an aircraft, regardless of the actual use made of it.

This means that, in the case of some aircraft placed under a high level of mechanical stress, maintenance operations may be carried out at the correct time. However, in the case of aircraft placed under less stress, maintenance operations may be performed too regularly and may therefore result in maintenance costs that are disproportionate in view of the actual use made of the aircraft. Indeed, the actual use of an aircraft has a direct impact on the actual level of damage to its constituent parts. Such a cost is all the more substantial when it involves simultaneously replacing a set of several parts, such as the engine of the aircraft, in particular.

The term "part" is therefore used hereinafter to refer indiscriminately to a single part of the aircraft or a set of parts that may or may not be connected together mechanically.

Moreover, predicting the quality of an aircraft flight by using a neural network is also known. In particular, a publication titled "A method for predicting aircraft flying qualities using neural networks" was disclosed by Wenqian Tan, Yu Wu, Xiangju Qu and A. V. Efremov at the "2nd International Conference on Systems and Informatics" (IC-SAI 2014) in Shanghai, China.

In this case, however, the neural network is configured by means of a supervised learning method. Moreover, such a learning method is carried out in the aircraft; in other words, the neural network learns while the aircraft is on a mission.

Such a publication therefore does not describe a checking system that helps optimize the maintenance costs linked to the actual use of an aircraft.

Systems using a neural network configured to estimate flight data of an aircraft such as a helicopter are also known, as described in document U.S. Pat. No. 6,466,888.

These estimation systems use flight data such as the speed, sideslip and angle of attack of the aircraft. Existing flight sensors can be used to measure flight parameters and provide them to a neural network used to calculate flight data estimates.

These flight data estimates are then used by the pilot and a ground crew to communicate indications to them relating to dangerous flight conditions such as stalling, loss of tail-rotor effectiveness and the state of vortex rings that may cause a loss of lift of such a helicopter.

However, as above, such a document therefore does not disclose a checking system that helps optimize the maintenance costs linked to the actual use of an aircraft.

A method for analyzing the flight data of an aircraft in order to determine, for each piece of flight data, a corresponding flight phase of the aircraft, is also known, as described in document FR 2 989 186. The flight data constituting an aircraft mission may thus be broken down into a plurality of groups representative of the different flight phases of the mission.

Such a breakdown of the recorded data is carried out automatically and can be robust to recording defects.

However, this breakdown of the flight data is carried out in this instance in order to give airlines a detailed understanding of the progress of a flight based on regular recordings of this flight data, made during each flight by each of their planes. The system can then detect predefined events occurring during the flight and identify that a technical incident has taken place during this flight and/or that a procedure or condition required by a flight procedure has not been complied with.

The aim of this breakdown of the flight data is therefore not to identify a level of damage of a part of an aircraft in order to optimize the corresponding maintenance costs.

Moreover, as described in document EP 2 676 176, the monitoring of the flight data of an aircraft in order to be able to anticipate maintenance operations of an aircraft engine, is known. Such a monitoring system may also use a neural network to analyses the variations in this flight data over time.

These monitoring systems therefore monitor the operation of the engines and the change in their states according to an unsupervised analysis of a trajectory of variation of the measurements related to an engine such as, in particular, the speed of rotation of an output shaft of the engine, the fuel flow consumed by the engine and the temperature of the exhaust gases of the engine.

Such monitoring systems can therefore be used to predict and schedule maintenance operations in a precise manner.

However, in this case, it is not a level of damage of a part that is estimated, but a trajectory of the future values of an operating parameter such as, in particular, the speed of rotation of the output shaft of the engine, the fuel flow and the temperature of the exhaust gases, using other trajectories taken from a database.

Document FR 3 006 785 describes a method for monitoring the operation of an aircraft engine based on a map of operating states of an aircraft engine.

The map of operating states is, moreover, produced from a background map drawn up from a database of operating states of a fleet of aircraft engines storing a series of parameters, each series of parameters comprising parameters characterizing an operating state of one of the engines and, possibly, at least one piece of degradation information indicative of a level of degradation of the aircraft engine.

Moreover, this document discloses, in particular, that such a map is drawn up from a database.

The background map comprises a set of cells, each cell being described by a code vector close to one or more series of parameters stored in the database, at least one of the cells being assigned at least one rate of degradation relative to a piece of degradation information, corresponding to the proportion of the series of parameters comprising the degradation information from the series of parameters close to the code vector of the cell.

A computer of a ground station then carries out a step consisting in determining a series of parameters characterizing an operating state of the engine to be monitored, based on data measured on the engine to be monitored. Next, the computer implements a step consisting in projecting the determined series of parameters into a cell, referred to as the target cell, of the map of aircraft engine operating states, and a step consisting in acquiring the at least one rate of degradation assigned to the target cell.

The use of a map comprising zones representative of the operating states of an engine, from a degraded operating state and a normal operating state, is thus described.

Different methods belonging to other technical fields have also been described in documents US 2008/091630 and FR 3 028 331.

SUMMARY

The object of the present disclosure is therefore to propose an alternative checking method and system that help overcome the above-mentioned limitations. Indeed, the checking method and system provide a solution that aims to customize the maintenance operations of an aircraft depending on the actual use made of it and, therefore, the actual level of wear and/or damage to at least one of its constituent parts. This can therefore help reduce the costs linked to the maintenance and servicing of aircraft whose actual use generates low levels of mechanical stress on its constituent parts.

The disclosure therefore relates to a method for checking a level of damage of at least one aircraft part.

According to the disclosure, such a method is remarkable in that it comprises at least:

a collection step for receiving data representative of measurements of at least one flight parameter chosen from the group comprising a position, a travel speed, an acceleration and an environmental parameter of the aircraft, the data being generated during a mission of the aircraft by at least one sensor embedded on the aircraft, each piece of data corresponding to an entry point representative of the flight parameter or parameters in a multidimensional space;

a projection step for projecting, according to a determined process, each entry point of the multidimensional space onto a previously constructed map in order to form an image point, the map comprising at least two separate zones defined by closed contour lines, each zone being representative of a flight phase of the aircraft chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase;

an identification step for identifying, for each image point, an image zone from the at least two separate zones in which the image point is located; and an analysis step for statistically analyzing the identified image zones and determining the level of damage of the aircraft part or parts as a function of at least two predetermined coefficients of the damage levels corresponding respectively to said at least two separate zones and at least two durations of use of the at least one part corresponding to said at least two separate zones.

In other words, such a method makes it possible to automatically determine the actual level of damage of one or more parts of an aircraft depending on the different flight phases it has carried out and therefore the actual use of this aircraft.

In order to do so, the data representative of the measurements of at least one flight parameter are collected on each mission or flight of the aircraft and, for example, stored in a memory. The flight parameter or parameters may be of different natures and be generated, for example, by one or more sensors measuring a vertical travel speed of the aircraft, an altitude from a barometric sensor and/or a satellite or other geolocation system, a height provided, for example, by a radar altimeter, accelerations from accelerometers or an inertial unit, an air speed of the aircraft obtained, for example, by Pitot probes, a position of a manual control member of the aircraft measured with a conventional position sensor, for example, vibrations measured on the aircraft and attitudes of the aircraft taken from a set of sensors on three axes allowing the position of an aircraft to be defined. Such a set of sensors may be part of an "Attitude and Heading Referential System", also referred to as an AHRS.

The received data, which may, for example, be raw, encrypted or encoded data, may in particular be processed, decoded or decrypted in order to be used. Such data thus forms, respectively, a multitude of entry points representative of the flight parameter or parameters in the multidimensional space. Such data makes it possible to form, at each acquisition, an entry point representing a flight phase of the aircraft. This entry point is represented in a multidimensional space whose dimension is equal to the number of flight parameters simultaneously measured by the different sensors.

The map may be previously constructed, for example by calculations, simulations or indeed flight tests.

The projection of the different entry points on the map allows a multitude of image points to be generated, belonging respectively to the different zones of the map.

Therefore, for each image point, a corresponding image zone is identified, and the statistical analysis of the different identified image zones makes it possible to determine the actual use of an aircraft depending, for example, on the frequency and intensity of the different flight phases carried out by the aircraft on its different missions.

The separate zones of the map with which each image zone corresponds are actually representative, respectively, of the different flight phases that are possible for an aircraft in general and for a rotorcraft in particular. Moreover, two or more separate zones of the map may correspond to the same flight phase chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase.

The statistical analysis step makes it possible, moreover, to correlate each image zone, and therefore each flight phase carried out by an aircraft, with at least one item of data characteristic of the damage to the aircraft part or parts. An item of data characteristic of the damage therefore makes it possible to quantify a level of damage, for example by means of a number of cycles, time or dedicated counters such as creep damage counters.

Therefore, a predetermined coefficient of a damage level can be assigned to each flight phase and therefore to each zone of the map. Such a predetermined coefficient of a damage level may therefore correspond to the damage caused by one hour of use of the at least one part.

Such a predetermined coefficient of a damage level may, in particular, be different in two separate zones of the map. Indeed, some flight phases, such as hovering flight phases, for example, may generate higher levels of mechanical stress than other flight phases, such as descent phases. Therefore, the predetermined coefficient of a damage level of the zone representative of hovering flight phases may have a higher value than the predetermined coefficient of a damage level of the zone representative of descending flight phases.

Such a predetermined coefficient of a damage level may also be different in two separate parts.

It may therefore be advantageous to store a plurality of predetermined coefficients of damage levels in a table of values or in a matrix.

For example, such a matrix may then comprise at least two rows corresponding to two flight phases and two columns corresponding to two parts of the aircraft or indeed to two groups of parts.

For each part, the analysis step makes it possible to calculate the total level of damage corresponding to the sum of each level of damage of the identified image zones multiplied by each duration of use.

Such durations of use may moreover be measured at each instant and stored in a memory, the total duration corresponding to a particular flight phase then being calculated by adding together all the durations stored in the memory for this flight phase.

Alternatively or additionally, a computer and a clock may be used to count the duration of use corresponding to each flight phase from the times recorded by the clock.

Such a total level of damage is thus linked to the flight phases actually carried out by an aircraft on each of its missions. Moreover, the total level of damage may be representative of a part or a group of parts and may be determined in flight during a mission of the aircraft or indeed on the ground once the aircraft's mission has been completed.

Advantageously, the map may be constructed during a preliminary learning phase according to the determined process using a set of standardized learning data.

This standardized learning data is obtained, for example, from measurements taken by sensors equipping a prototype aircraft during test flights.

In practice, the determined process may be a process based on Kohonen self-organizing mapping.

Such a self-organizing mapping method is a class of neural networks that learn in an unsupervised manner. This self-organizing mapping method is also often referred to by its acronym, "SOM".

According to a first embodiment of the disclosure, the map may be a three-dimensional map comprising a spherical shape with an icosahedral mesh.

In other words, this map then forms a closed space avoiding any edge effect. The discrimination boundaries between the separate zones of the map can be determined, for example, by partitioning the multidimensional space into a diagram referred to as a Voronoi diagram, calculated at the end of the preliminary learning phase.

According to a second embodiment of the disclosure, the map may be a two-dimensional map comprising a rectangular shape with a hexagonal mesh.

Indeed, a map of this type makes it possible to simplify the projection of the entry points onto the map and then the identification of the image zone corresponding to each image point. A two-dimensional map requires less advanced computing capabilities than a three-dimensional map.

Alternatively, according to a third embodiment of the disclosure, the map may be a two-dimensional map comprising a rectangular shape with a rectangular mesh.

In practice, the method may comprise a standardization step in order to standardize the data by generating standardized data representative of the measurements of the flight parameter or parameters, the standardized data corresponding to the entry points representative of the flight parameter or parameters in the multidimensional space.

Such a data standardization step may therefore be implemented after the collection step for receiving the data representative of measurements of at least one flight parameter.

Advantageously, the standardization step may comprise a sub-step of normalizing the data.

Such a normalization sub-step allows the data to be pre-processed, for example by means of polynomial, exponential and logarithmic transformations. This means the standardized data is no longer dependent on the context in which the data was acquired.

According to another aspect of the disclosure, the standardization step may comprise a sub-step of selecting the data.

In other words, the selection sub-step allows outliers or irrelevant data to be excluded, for example, in order to generate the standardized data.

In practice, the analysis step may comprise a sub-step of estimating a prediction reliability associated with the step of identifying the image zone.

Such a sub-step of estimating reliability is therefore advantageous in order to be able to output, after analysis, a relevance selection from the different image zones identified.

Advantageously, the method may comprise a step of recording the image zones and a step of reporting the level of damage of the aircraft part or parts.

Indeed, once the analysis step has been carried out, it may be advantageous to record the results corresponding to the different image zones identified and then subsequently to report these results in the form of a table or a graph such as, for example, a histogram.

According to another aspect of the disclosure, the method may comprise an adaptation step for transforming the at least two separate zones of the map over time using the entry points.

Such an adaptation step thus makes it possible to modify the map a posteriori depending on the actual data collected by a fleet of aircraft. This transformation of the at least two separate zones may consist in modifying the shape, the arrangement and/or the size of each of the zones on the map.

This adaptation step may also consist in modifying the number of separate zones of the map. This number may thus be increased if, for example, the accuracy of the determination of the level of damage of the parts of the aircraft needs to be enhanced. The number of separate zones may also be reduced if, for example, this determination of the level of damage of the parts of the aircraft needs to be simplified or accelerated.

Moreover, such a checking method may be implemented in different ways corresponding to different complementary embodiments possibly involving the same aircraft.

Therefore, according to a first embodiment of the disclosure, the method being implemented in the aircraft, the method may comprise a step of generating a piece of information in order to inform at least a pilot of the aircraft that the level of damage of an aircraft part is higher than a first predetermined threshold value.

In other words, the checking method is in this instance implemented during a mission of the aircraft and, for example, in flight. If the method detects that a level of damage has reached the first threshold value, an information step may be implemented. Such an information step may for example comprise displaying an information message on a control screen.

The pilot may then optionally choose to cut short the mission if the information message concerns the level of damage of one or more critical parts. In other cases in which the information message is only for information purposes, the pilot may also choose to continue the mission. Moreover, the method may then possibly comprise a step of scheduling a maintenance operation in order to replace the damaged part.

According to a second embodiment of the disclosure, the method being implemented on the ground in a ground station, the method may comprise a scheduling step in order to schedule maintenance of the aircraft and proceed to replace the aircraft part or parts when the level of damage of the aircraft part or parts is higher than a second predetermined threshold value.

According to the second embodiment, the scheduling step makes it possible to warn a maintenance team that the level of damage of one or more parts has reached the second predetermined threshold value. This part may then be replaced immediately or at short notice by this maintenance team responsible for servicing this aircraft.

Such a second predetermined threshold value may be equal to the first predetermined threshold value. However, the second threshold value may also be different from the first threshold value when, in particular, the method may be implemented both in flight in an aircraft and on the ground in a ground station.

The present disclosure also relates to a system for checking a level of damage of at least one aircraft part.

According to the disclosure, this checking system is remarkable in that it comprises:
  a connection interface configured to receive data representative of measurements of at least one flight parameter chosen from the group comprising a position, a travel speed, an acceleration and an environmental parameter of the aircraft, the data being generated over a period of time during a mission of the aircraft by at least one sensor embedded on this aircraft, then collected by the connection interface, each piece of data corresponding to an entry point representative of the flight parameter in a multidimensional space;
  processing means configured to project, according to a determined process, each entry point of the multidimensional space onto a previously constructed map in order to form an image point, the map comprising at least two separate zones defined by closed contour lines, each zone being representative of a flight phase of the aircraft chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase;
  identification means configured to identify, for each image point, an image zone from the at least two separate zones; and
  analysis means configured to statistically analyses the identified image zones and determine the level of damage of the aircraft part or parts as a function of at least two predetermined coefficients of the damage levels corresponding respectively to said at least two separate zones and at least two durations of use of the at least one part corresponding to said at least two separate zones.

Such a checking system may, in particular, be arranged in an aircraft or indeed in a ground station and is in this case remote from the aircraft.

When the checking system is arranged on the aircraft, the data may be transmitted instantaneously in flight or in a delayed manner to the connection interface in order to be processed.

In the event that the checking system is arranged in the ground station, the data is thus transferred to the checking system instantaneously in flight or at the end of the mission carried out by the aircraft.

The processing means may be referred to as a computer, the identification means as an identifier and the analysis means as an analyzer.

Moreover, the processing means, the identification means and the analysis means may respectively comprise, for example, at least one processor and at least one memory, at least one integrated circuit, at least one programmable system, at least one logic circuit, at least one computing means, a central processing unit or CPU, a graphics processing unit or GPU, a digital signal processor or DSP, a microcontroller, etc.

Moreover, the processing means, the identification means and the analysis means may form assemblies separate from each other or indeed form a single assembly suitable for carrying out the different tasks of the checking system.

When the checking system is arranged on the aircraft, the processing means, the identification means and the analysis means may be fitted to the aircraft or indeed be formed, for example, by a computing means pre-equipping the aircraft.

Moreover, the analysis means may comprise a clock and a computer making it possible to calculate the total duration of use of a part or a group of parts corresponding to each identified flight phase.

The disclosure also relates to an aircraft comprising at least one aircraft part having a level of damage that changes over time depending on the use of this aircraft.

According to the disclosure, such an aircraft is remarkable in that it comprises a system for checking a level of damage of the aircraft part or parts as described above.

Therefore, such an aircraft also makes it possible to implement the checking method described above during a mission of the aircraft or indeed once this aircraft's mission has been completed.

In practice, the checking system may comprise at least one information member configured to inform at least a pilot of the aircraft that the level of damage of the aircraft part or parts is higher than a first predetermined threshold value.

Such an information member may advantageously be arranged on an instrument panel of the aircraft. The information member may be dedicated to displaying information messages of the checking system or indeed comprise a display screen with display functions shared with other systems of the aircraft.

BRIEF DESCRIPTION OF THE DRAWINGS

The disclosure and its advantages appear in greater detail from the following description of examples given by way of illustration with reference to the accompanying figures, in which.

DETAILED DESCRIPTION

Elements present in more than one of the figures are given the same references in each of them.

As already disclosed, the disclosure relates to the field of systems for checking a level of damage of at least one aircraft part.

Figure 1:
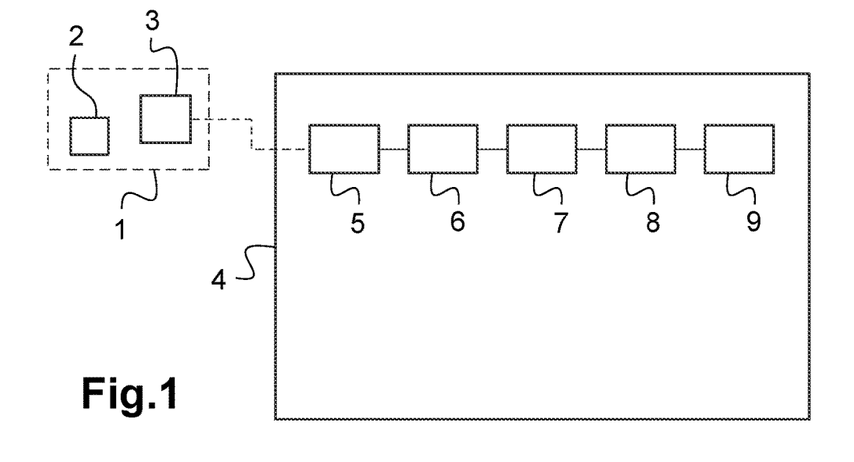
FIG. 1 is a schematic diagram of a checking system according to the disclosure.
Figure 2:
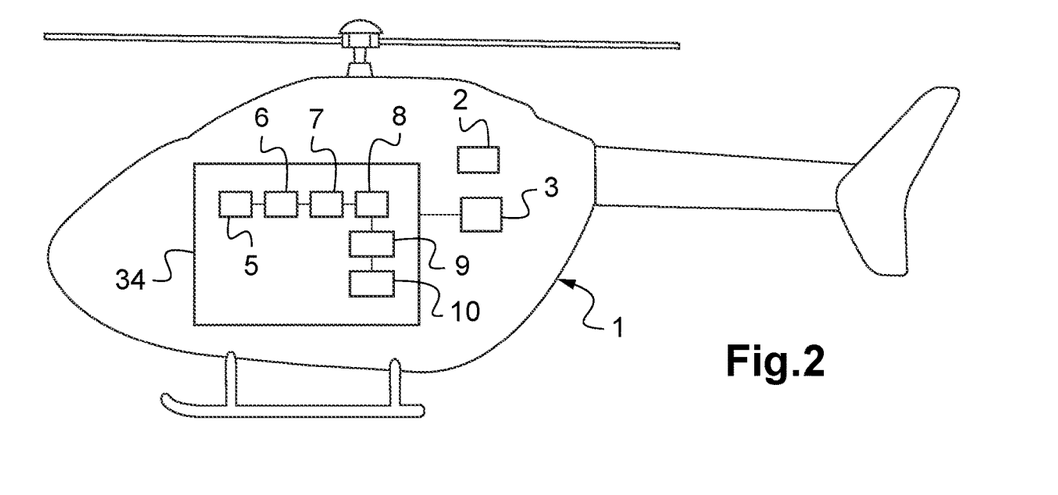
FIG. 2 is a diagram showing an aircraft according to the disclosure.
Figure 3:
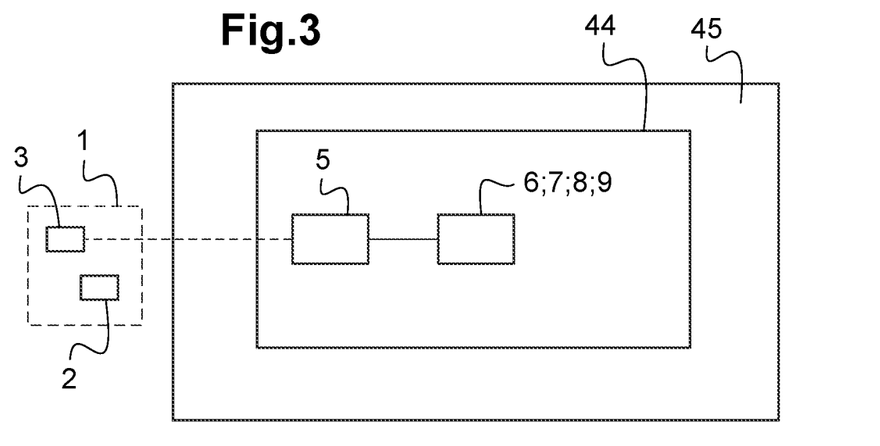
FIG. 3 is a diagram showing a ground station, according to the disclosure.

As shown in FIGS. 1 to 3, such checking systems 4, 34, 44 may be in different forms.

However, these checking systems 4, 34, 44 each comprise at least one connection interface 5 configured to receive data representative of measurements of at least one flight parameter chosen from the group comprising a position, a travel speed, an acceleration and an environmental parameter of the aircraft 1. Such data is generated over a period of time during a mission of an aircraft 1 by at least one sensor 3 embedded on the aircraft 1, then collected by the connection interface 5.

The flight parameter or parameters may therefore be of different natures and be measured, for example, by one or more sensors 3. For example, a flight parameter may be a vertical travel speed of the aircraft 1, an altitude from a barometric sensor and/or a satellite geolocation system, a height provided by a radar altimeter, accelerations from accelerometers or an inertial unit, an air speed of the aircraft 1 obtained by Pitot probes, a position of a manual control member of the aircraft 1, vibrations measured on the aircraft 1 and attitudes of the aircraft 1 taken from a set of sensors on three axes allowing the position of the aircraft 1 to be defined. Such a set of sensors 3 is generally known as an "Attitude and Heading Referential System", also referred to as an AHRS.

The checking systems 4, 34, 44 may advantageously each comprise a processing unit 6 configured to generate standardized data representative of the measurements of the flight parameter or parameters, each piece of standardized data thus corresponding to an entry point representative of the flight parameter or parameters in a multidimensional space.

Moreover, the checking systems 4, 34, 44 also comprise processing means 7 configured to project, according to a determined process, each entry point of the multidimensional space onto a previously constructed map in order to form an image point.

Figure 6:
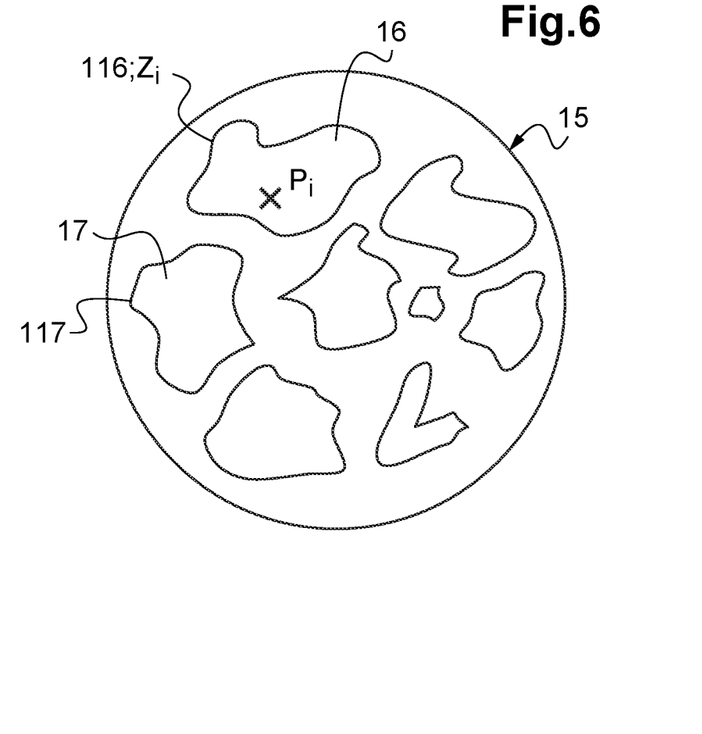
FIG. 6 is a first map variant, according to the disclosure.
Figure 7:
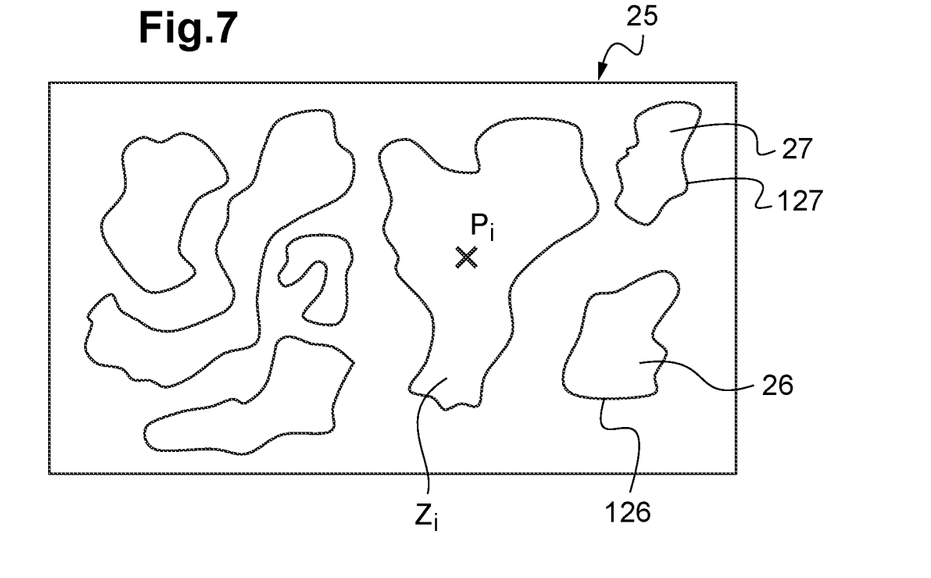
FIG. 7 is a second map variant, according to the disclosure.

As described in FIGS. 6 and 7, according to two variants, such a map 15, 25 comprises at least two separate zones 16 and 17, 26 and 27 each defined by closed contour lines 116 and 117, 126 and 127.

Such zones 16 and 17, 26 and 27 are representative of different flight phases of the aircraft 1 chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase and a transition phase.

The checking systems 4, 34, 44 thus comprise identification means 8 configured to identify, for each image point Pi, an image zone Zi from the at least two separate zones 16 and 17, 26 and 27 and analysis means 9 configured to statistically analyses the identified image zones Zi and determine the level of damage of the aircraft part or parts 2.

As shown in FIGS. 1 and 2, the processing unit 6, the processing means 7, the identification means 8 and the analysis means 9 may be members separate from each other.

Alternatively, according to another variant and as shown in FIG. 3, the processing unit 6, the processing means 7, the identification means 8 and the analysis means 9 may also be combined in the same member, for example in the form of a computing means.

Regardless of the selected variant, the processing unit 6, the processing means 7, the identification means 8 and the analysis means 9 may each comprise, for example, at least one processor and at least one memory, at least one integrated circuit, at least one programmable system, at least one logic circuit, these examples not limiting the scope given to the expressions "processing unit", "processing means", "identification means" and "analysis means". The term "processor" may refer equally to a central processing unit or CPU, a graphics processing unit or GPU, a digital signal processor or DSP, a microcontroller, etc.

According to the example in FIG. 2, such a checking system 34 may be embedded on the aircraft 1. In this case, the checking system 34 may comprise at least one information member 10 configured to inform at least a pilot of the aircraft 1 when the level of damage of the aircraft part or parts 2 is higher than a first predetermined threshold value.

Such an information member 10 may then generate an audible, visual or vibratory information signal and the pilot of the aircraft 1 may then choose, depending on the potential risk linked to this level of damage or to the part in question, to adapt and/or cut short the mission, for example.

In this case, the checking system 34 may, in particular, receive the data in real time during a mission of the aircraft 1.

Optionally, when the level of damage of the aircraft part or parts 2 is higher than a first predetermined threshold value, the information may also be transmitted to a memory device or transmission member in order to communicate the information, for example, to a ground station. This communication of information may take place in flight during the aircraft's mission or indeed subsequently, once the aircraft's mission has been completed.

According to the variant of FIG. 3, a checking system 44 may also, alternatively or additionally, be arranged in a ground station 45.

In this case, the checking system 44 is separate from the aircraft 1 and may, in particular, receive the data once the mission of the aircraft 1 has been completed.

Figure 4:
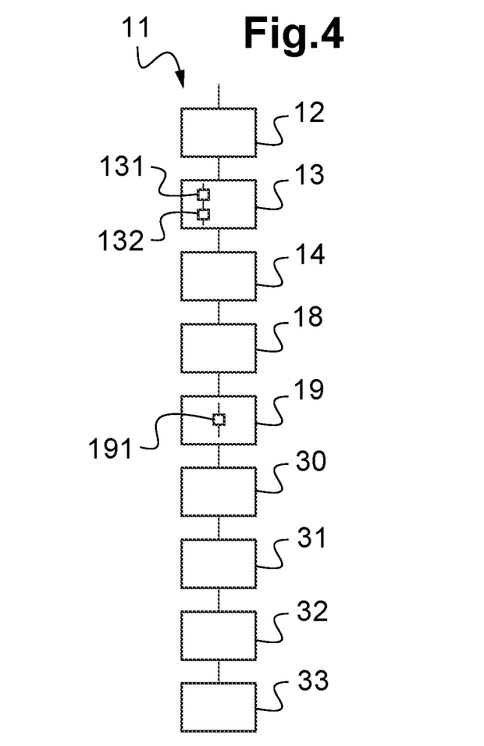
FIG. 4 is a logic diagram representative of a first embodiment of the checking method according to the disclosure.
Figure 5:
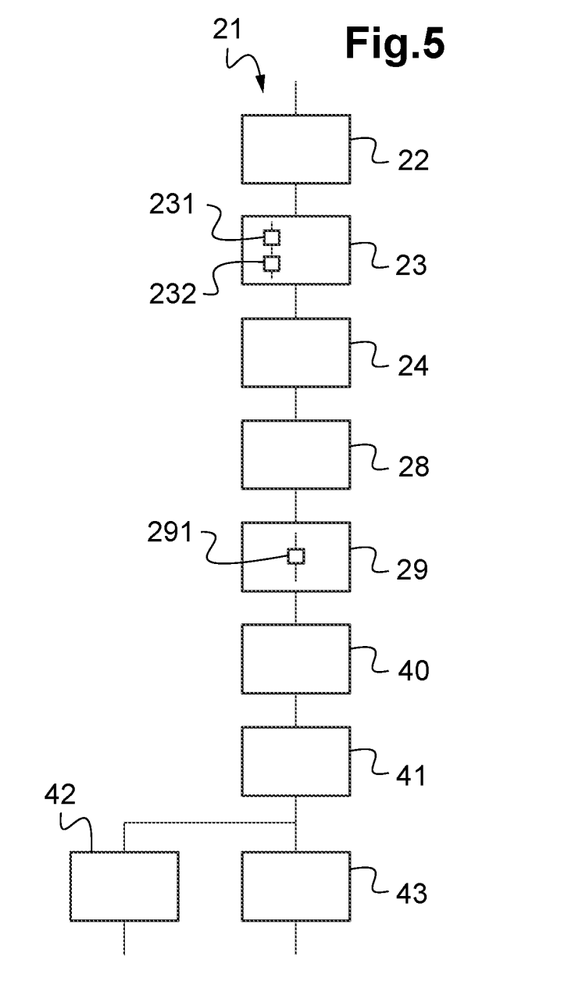
FIG. 5 is a logic diagram representative of a second embodiment of the checking method according to the disclosure.

As shown in FIGS. 4 and 5, the disclosure also relates to a method 11, 21 for checking a level of damage of at least one part 2 of an aircraft 1.

These methods 11, 21 thus each comprise a collection step 12, 22 for receiving data representative of measurements of at least one flight parameter chosen from the group comprising a position, a travel speed, an acceleration and an environmental parameter of the aircraft 1. As already indicated above, such data is generated over a period of time during a mission of the aircraft 1 by at least one sensor 3 embedded on the aircraft 1.

The methods 11, 21 may then comprise, in particular, a standardization step 13, 23 in order to standardize the data by generating standardized data representative of the measurements of the flight parameter or parameters, each piece of standardized data thus corresponding to an entry point representative of the flight parameter or parameters in a multidimensional space.

Advantageously, these standardization steps 13, 23 may respectively comprise a sub-step 131, 231 of normalizing the data and a sub-step 132, 232 of selecting the data.

Next, the methods 11, 21 then comprise a projection step 14, 24 for projecting, according to a determined process, each entry point of the multidimensional space onto a previously constructed map 15, 25 in order to form an image point Pi.

As already indicated, the zones 16 and 17, 26 and 27 of the map 15, 25 are each representative of a flight phase of the aircraft 1 chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase.

The methods 11, 21 then comprise an identification step 18, 28 for identifying, for each image point Pi, an image zone Zi from the at least two separate zones 16 and 17, 26 and 27 in which the image point Pi is located and an analysis step 19, 29 for statistically analyzing the identified image zones in order to determine the level of damage of the aircraft part or parts 2.

In practice, these analysis steps 19, 29 may advantageously comprise a sub-step 191, 291 of estimating a prediction reliability associated with the step 18, 28 of identifying the image zone.

Such a prediction reliability may advantageously be linked to the measurement accuracy of the different sensors 3 used or be determined based on predetermined rules by calculations, simulations or flight tests, in particular.

Moreover, a recording step 30, 40 may also be used to store the different image zones Zi encountered during a mission and a reporting step 31, 41 may be used to subsequently or simultaneously report the level of damage of the aircraft part or parts 2.

Moreover, such a level of damage of a part 2 depends directly on the nature and the number of the image zones Zi registered during the different missions carried out by the aircraft 1.

For example, the level of damage of an aircraft part 2 for which two image zones Zi have been identified and corresponding to a take-off phase and a landing phase is quite obviously lower than the level of damage of the same aircraft part for which three image zones Zi have been identified and corresponding to a take-off phase, a hovering flight phase and a landing phase.

For example, a predetermined coefficient of a damage level can be assigned to each flight phase and therefore to each zone of the map. Such different predetermined coefficients of the level of damage are then advantageously determined upstream of a mission of the aircraft by tests, simulations and/or feedback. The damage coefficients are then stored and saved in a memory that may be embedded in the aircraft, in a portable electronic device or optionally in a computing means on the ground.

Advantageously, the damage coefficients may be contained in a table of values or indeed a matrix. Each row may correspond, for example, to a flight phase and each column may correspond to a specific part, group of parts or indeed to a zone of the aircraft.

Such a predetermined coefficient of a damage level may, in particular, be different in two separate zones 16 and 17, 26 and 27 of the same map 15, 25. Indeed, some flight phases, such as hovering flight phases, for example, may generate higher levels of mechanical stress than other flight phases, such as descent phases. Therefore, the predetermined coefficient of a damage level of the zone 16, 26 representative of hovering flight phases may have a higher value than the predetermined coefficient of a damage level of the zone 17, 27 representative of descending flight phases.

The analysis step 19, 29 makes it possible to quantify, for a part 2 and for a flight phase, the level of damage corresponding to the product of a predetermined coefficient of a damage level of this identified image zone Zi multiplied by the actual duration of use corresponding to this flight phase.

Such a total level of damage of this part 2 therefore corresponds to the sum of the damage levels linked to the different flight phases actually carried out by an aircraft 1 on each of its missions. Such a total level of damage of a part 2 may moreover be determined in flight during a mission of the aircraft 1 or indeed on the ground once the mission of the aircraft 1 has been completed.

As shown, the methods 11, 21 may then comprise an adaptation step 32, 42 for transforming the at least two separate zones 16 and 17, 26 and 27 of the map 15, 25 over time using the entry points.

This adaptation step 32, 42 thus makes it possible to modify the map 15, 25 a posteriori depending, for example, on the actual data collected by a fleet of aircraft 1. This transformation of the at least two separate zones 16 and 17, 26 and 27 may consist in modifying the shape, the arrangement and/or the size of each of the separate zones 16 and 17, 26 and 27 on the map 15, 25.

As shown in FIG. 4, this adaptation step 32 may be carried out prior to an information step 33 for informing at least a pilot of the aircraft 1 that the level of damage of the aircraft part or parts 2 is higher than a first predetermined threshold value.

According to another variant not shown here, this adaptation step 32 may also be carried out in parallel with or subsequent to such an information step 33.

As shown in FIG. 5, when the method 21 is implemented in a ground station 45, this adaptation step 42 may be carried out in parallel with a scheduling step 43 suitable for scheduling a maintenance operation for the aircraft 1 and proceeding to replace the aircraft part or parts 2 when their level of damage is higher than a second predetermined threshold value.

Moreover, such an adaptation step 32, 42 may, in particular, allow the number of separate zones 16 and 17, 26 and 27 of the map 15, 25 to be modified. The adaptation step 32, 42 makes it possible to modify the map 15, 25 and increase the number of separate zones 16 and 17, 26 and 27 that it comprises if, for example, the accuracy of determination of the level of damage of the parts 2 of the aircraft 1 needs to be enhanced. The number of separate zones and 17, 26 and 27 may also be reduced if, for example, the determination of the level of damage of the parts 2 of the aircraft 1 needs to be simplified or accelerated.

Advantageously, a method according to the disclosure may moreover comprise both an information step 33 for informing at least a pilot of the aircraft 1 that the level of damage of the aircraft part or parts 2 is higher than a first predetermined threshold value and a scheduling step 43 suitable for scheduling a maintenance operation for the aircraft 1 and proceeding to replace the aircraft part or parts 2 when their level of damage is higher than a second predetermined threshold value.

Moreover, the first predetermined threshold value and the second predetermined threshold value may be either equal to or different from each other.

When these predetermined threshold values are equal, a pilot can thus be informed in flight that a part has reached a level of damage at which it requires a maintenance operation.

This is particularly advantageous for certain non-critical parts which, upon reaching a high level of damage, nevertheless allow the pilot to complete the current mission.

When these predetermined threshold values are different from each other, a pilot can thus be informed in flight that the level of damage of a part has reached the first predetermined threshold value. This part therefore does not need to be replaced immediately, but the pilot knows that the level of damage of the part is approaching the second predetermined threshold value requiring a maintenance operation.

This is particularly advantageous for certain critical parts which, upon reaching a high level of damage, will not allow the pilot to complete the current mission.

Moreover, according to a first variant as shown in FIG. 6, the map 15 may be chosen as a three-dimensional map comprising a spherical shape with an icosahedral mesh.

According to a second variant as shown in FIG. 7, the map 25 may also be chosen as a two-dimensional map comprising a rectangular shape with a hexagonal mesh. According to another variant not shown here, the map may also be a two-dimensional map comprising a rectangular shape with a rectangular mesh.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. A method for checking a level of damage of at least one part of an aircraft to customize maintenance operations of the aircraft depending on usage of the at least one aircraft part and reduce a maintenance frequency of the aircraft,
wherein the method comprises at least:
collecting, during a flight of the aircraft, data representative of measurements of at least one flight parameter chosen from the group comprising a position, a travel speed, an acceleration, and an environmental parameter of the aircraft, the data being generated during the flight of the aircraft by at least one sensor embedded on the aircraft, each piece of the data corresponding to an entry point representative of the at least one flight parameter in a multidimensional space;
projecting, according to a determined process, each entry point of the multidimensional space onto a previously constructed map in order to form a respective image point, the map comprising at least two separate zones defined by closed contour lines, each zone of the at least two separate zones being representative of a flight phase of the aircraft chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase;
identifying, for each respective image point, an image zone from the at least two separate zones in which the image point is located;
analyzing for quantifying, for the at least one aircraft part and for the flight phase, the level of damage of the at least one aircraft part corresponding to a product of a predetermined coefficient associated with the flight phase multiplied by a total duration of use of the at least one aircraft part for the flight phase, the total duration of use of the at least one aircraft part for the flight phase being a sum of all durations of use of the at least one aircraft part carried out for the flight phase during flights of the aircraft, the flight phase corresponding to the image zone identified from the at least two separate zones; and
wherein the level of damage of the at least one aircraft part exceeding a predetermined threshold value is determined from the quantifying; and
with at least one information member, in response to determining the level of damage of the at least one aircraft part has exceeded the predetermined threshold value, informing an operator via an audible, visual, and/or vibratory information signal that the level of damage of the at least one aircraft part has exceeded the predetermined threshold value; and
scheduling a maintenance operation of the aircraft in response to determining the level of damage of the least one aircraft part has exceeded the predetermined threshold value.

2. The method according to claim 1,
wherein the map is constructed during a preliminary learning phase according to the determined process using a standardized set of learning data.

3. The method according to claim 1,
wherein the determined process is a process based on Kohonen self-organizing mapping.

4. The method according to claim 1,
wherein the map is a three-dimensional map comprising a spherical shape with an icosahedral mesh.

5. The method according to claim 1,
wherein the map is a two-dimensional map comprising a rectangular shape with a hexagonal mesh.

6. The method according to claim 1,
wherein the method comprises a standardizing the data by generating standardized data representative of the measurements of the at least one flight parameter, the standardized data corresponding to the entry points representative of the at least one flight parameter in the multidimensional space.

7. The method according to claim 6,
wherein the standardizing comprises a sub-step of normalizing the data.
8. The method according to claim 6,
wherein the standardizing comprises a sub-step of selecting the data.
9. The method according to claim 1,
wherein the analyzing comprises estimating a prediction reliability associated with the identifying, for each respective image point, the image zone.
10. The method according to claim 1,
wherein the method comprises recording the image zones and reporting the level of damage of the at least on part of the aircraft.
11. The method according to claim 1,
wherein the method comprises transforming the at least two separate zones of the map over time using the entry points.
12. The method according to claim 1,
wherein the method is implemented in the aircraft, and the operator is a pilot of the aircraft.
13. The method according to claim 1,
wherein the method is implemented on the ground in a ground station, the predetermined threshold value is a first predetermined threshold value, and the level of damage of the at least one aircraft part has exceeded a second predetermined threshold value higher than the first predetermined threshold value is determined from the quantifying, and the method comprises replacing the at least one aircraft part during the maintenance operation in response to the level of damage of the at least one aircraft part exceeding the second predetermined threshold value.
14. A system for checking a level of damage of at least one part of an aircraft to customize maintenance operations of the aircraft depending on usage of the at least one aircraft part and reduce a maintenance frequency of the aircraft,
wherein the system comprises:
a processor configured to receive, during a flight of the aircraft, data representative of measurements of at least one flight parameter chosen from the group comprising a position, a travel speed, an acceleration, and an environmental parameter of the aircraft, the data being generated during the flight of the aircraft by at least one sensor embedded on the aircraft, pieces of the data corresponding to entry points representative of the at least one flight parameter in a multidimensional space;
the processor being configured to project, according to a determined process, each entry point of the multidimensional space onto a previously constructed map in order to form a respective image point, the map comprising at least two separate zones defined by closed contour lines, each zone of the at least two separate zones being representative of a flight phase of the aircraft chosen from the group comprising an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase and a transition phase;
an identifier means configured to identify, for each respective image point, an image zone from the at least two separate zones in which the image point is located;
an analyzer configured to analyze for quantifying, for the at least one aircraft part and for the flight phase, the level of damage of the at least one aircraft part corresponding to a product of a predetermined coefficient associated with the flight phase multiplied by a total duration of use of the at least one aircraft part for the flight phase, the total duration of use of the at least one aircraft part for the flight phase being a sum of all durations of use of the at least one aircraft part carried out for the flight phase during flights of the aircraft, the flight phase corresponding to the image zone identified from the at least two separate ones; and
at least one information member that, in response to the analyzer determining the level of damage of the at least one aircraft part has exceeded a predetermined threshold value, is configured to inform an operator of the system via an audible, visual, and/or vibratory information signal that the level of damage of the at least one aircraft part has exceeded the predetermined threshold value.
15. An aircraft comprising at least one aircraft part having a level of damage that changes over time depending on the use of the aircraft,
wherein the aircraft comprises the system for checking the level of damage of the at least one aircraft part according to claim 14.
16. The aircraft according to claim 15,
wherein the at least one information member, in response to the analyzer determining the level of damage of the at least one aircraft part has exceeded the predetermined threshold value, is further configured to inform at least a pilot of the aircraft that a maintenance operation of the aircraft is to be scheduled.
17. A method for checking a level of damage of at least one part of an aircraft to customize maintenance operations of the aircraft depending on usage of the at least one aircraft part and reduce a maintenance frequency of the aircraft,
wherein the method comprises:
collecting, during a flight of the aircraft, data representative of measurements of at least one flight parameter selected from the group consisting of a position, a travel speed, an acceleration, and an environmental parameter of the aircraft, the data generated during the flight of the aircraft by a sensor on the aircraft, pieces of the data corresponding to entry points representative of the at least one flight parameter in a multidimensional space;
projecting each entry point of the multidimensional space onto a previously constructed map in order to form a respective image point, the map comprising at least two separate zones defined by closed contour lines, each zone of the at least two separate zones representative of a flight phase of the aircraft selected from the group consisting of an approach phase, a landing phase, a hovering flight phase, a low-speed maneuvering phase, a take-off phase, a descent phase, a climbing phase, a ground phase, a turning phase, a level flight phase, a fixed-point turning phase, a recovery phase, a taxiing phase, and a transition phase;
identifying, for each respective image point, an image zone from the at least two separate zones in which the image point is located;
analyzing to quantify, for the at least one aircraft part and for the flight phase, the level of damage of the at least one aircraft part corresponding to a product of a predetermined coefficient associated with the flight phase multiplied by a total duration of use of the at least one aircraft part for the flight phase, the total duration of use of the at least one aircraft part for the flight phase being a sum of all durations of use of the at least one aircraft part carried out for the flight phase during flights of the aircraft, the flight phase corresponding to the image zone identified form the at least two separate zones; and wherein the level of damage of the at least one aircraft part exceeding a predetermined threshold value is determined from the analyzing; and informing a pilot of the aircraft, via an audible, visual, and/or vibratory information signal, in response to determining the level of damage of the at least one aircraft part has exceeded the predetermined threshold value, that the level of damage of the at least one aircraft part has exceeded the predetermined threshold value;

scheduling a maintenance operation of the aircraft in response to determining the level of damage of the at least one aircraft part has exceeded the predetermined threshold value; and replacing the at least one aircraft part during the maintenance operation of the aircraft.

18. The method according to claim 17,
wherein the map is constructed during a preliminary learning phase using a standardized set of learning data.

19. The method according to claim 17,
wherein the map is constructed based on Kohonen self-organizing mapping.

20. The method according to claim 17,
wherein the method comprises standardizing the data by generating standardized data representative of the measurements of the at least one flight parameter, the standardized data corresponding to the entry points representative of the at least one flight parameter in the multidimensional space.

* * * * *